Jan. 8, 1963 J. J. ZIMMERMANN 3,072,746

AUTOMATIC TELEPHONE DIALING APPARATUS

Filed May 1, 1957

INVENTOR.
JOSEPH J. ZIMMERMANN

BY Andrus & Sceales

Attorneys 3,072,746

AUTOMATIC TELEPHONE DIALING APPARATUS

Joseph J. Zimmermann, Milwaukee, Wis., assignor to Electronic Secretary Industries, Inc., Milwaukee, Wis., a corporation of Wisconsin Filed May 1, 1957, Ser. No. 656,281
10 Claims. (Cl. 179—5)

This invention relates to automatic dialing of telephones and in particular to an electrically operated device employing a previously recorded telephone number.

The present trend in telephone dialing systems is toward telephone numbers employing more characteristics or digits to allow inclusion of more telephones within one system. The greater number of digits causes increased confusion and inconvenience in the dialing of a telephone number.

In times of emergency, even a relatively few characteristics in a telephone number is apt to result in confusion and misdialing of the necessary party.

In other instances, personnel is placed to periodically check apparatus which is located at some distance from a central station. The personnel calls the central station by telephone and reports malfunctioning of the apparatus. This method of fault detection is relatively costly and time consuming and is only as accurate and trustworthy as the personnel involved.

The present invention provides an automatic dialing means for push-button dialing and also for automatically dialing a distant telephone in response to a predetermined disturbance or happening. Apparatus of the present invention may be disposed adjacent operational apparatus disposed at a distance from a central office to automatically telephone the central office and give warning of malfunctioning of the operational apparatus.

In accordance with the present invention, the telephone number which is to be dialed and a message which is to be transmitted, if any, is successively set up on a suitable storage record. A reproducer is operatively associated with the record to translate the number coded on the storage record to suitable electrical signals, and is actuated in response to either a push-button or some local disturbance. Electrically operated apparatus is connected to these electrical signals and to the telephone line to load the telephone line and to simulate the manual dialing of a distant telephone.

The accompanying drawing illustrates the best mode presently contemplated by the inventor for carrying out the invention.

Figures 1, 2, 3, 4:
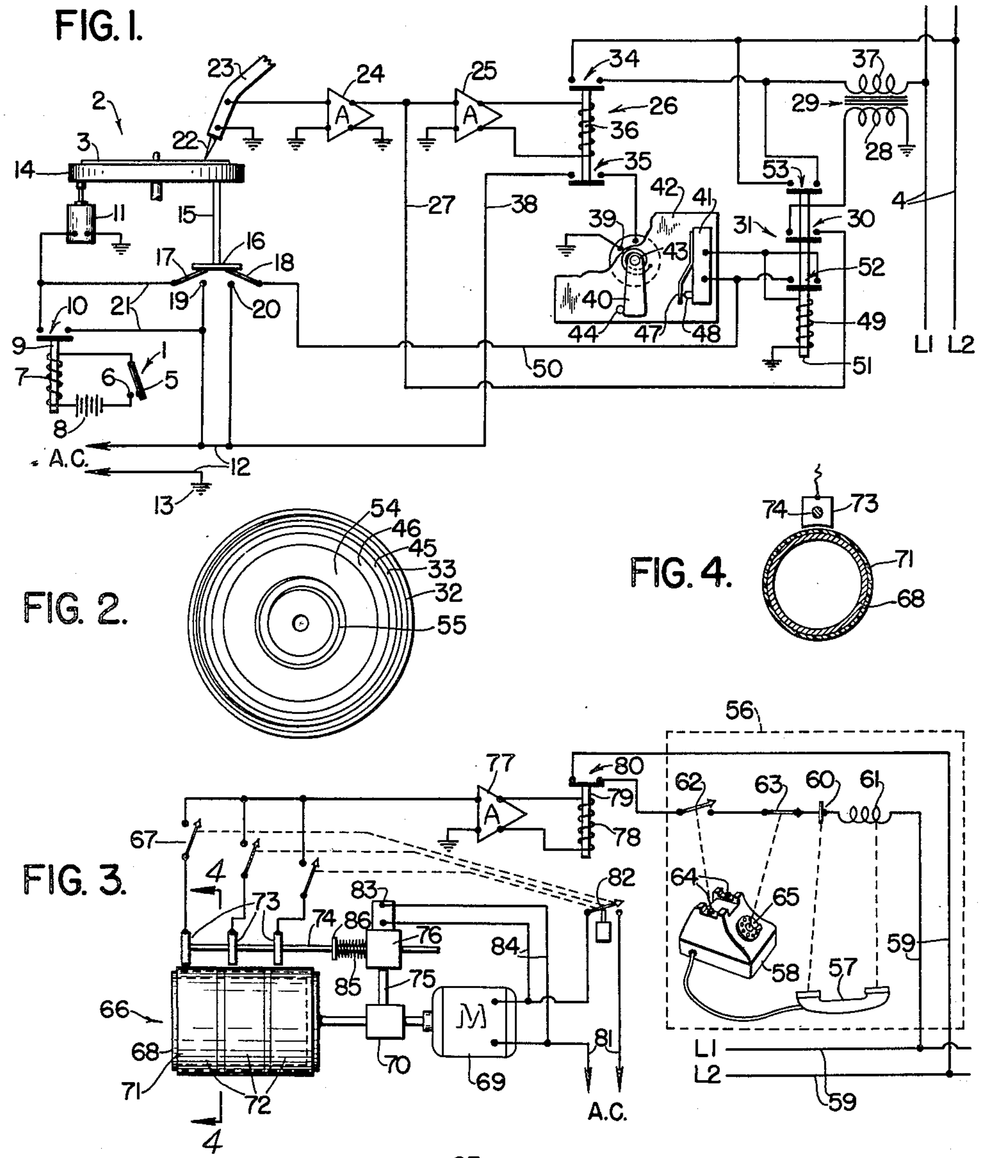
FIGURE 1 is a schematic circuit of a detection circuit employing the present invention.
FIG. 2 is an enlarged plan view of a disc type record for the reproducer of FIGURE 1.
FIG. 3 is a diagrammatic illustration of push-button apparatus for automatically dialing a telephone.
FIG. 4 is a view taken on line 4—4 of FIG. 3.

Referring to the drawing and particularly FIGURE 1, the first illustrated embodiment of the invention comprises generally a bimetallic detector 1 which is responsive to a local thermal condition to control a reproducer 2. The reproducer is adapted to pick up the signals established on a record 3 and operatively connect them to the telephone line 4 to dial a distant telephone station, not shown, and then transmit a message thereto.

The illustrated bimetallic detector 1 is of any suitable type and generally comprises a strip of two dissimilar metals 5 normally holding the set of contacts 6 in open position. In the event of a predetermined local thermal disturbance, the strip 5 deflects because of the unequal expansion rate of the two dissimilar metals and closes the contacts 6.

The contacts 6 are serially connected with a triggering relay winding 7 and a suitable power source shown as a battery 8. Therefore, when the contacts 6 close, the relay winding 7 is energized by current from the battery.

The relay winding 7 electromagnetically controls a movable armature 9 to make and break a set of normally open contacts 10. The contacts 10 are serially connected with a reproducer motor 11 in a power circuit across a set of alternating current power lines 12.

One power line 12 is shown grounded at 13 and the various electrical apparatus hereinafter described in the present embodiment is shown with one terminal grounded in each instance. This grounded terminal provides the return path to the power lines 12 from the apparatus.

The illustrated reproducer 2 includes a turntable 14 which is driven by the motor 11 through suitable coupling mechanism, not shown. The turntable mechanism, not shown, includes a vertically movable pin 15 such as shown in the United States Patent No. 2,394,539 to J. Erwood et al. The pin 15 is normally in a retracted upper position and upon predetermined operation of the reproducer 2 extends vertically downward and remains in that position until the reproducer is reset to its initial position. A switch actuator 16 is secured to the end of pin 15 and engages a first switch arm 17 and a second switch arm 18 when the pin is depressed. The switch arms 17 and 18 are normally disengaged from contacts 19 and 20, respectively, with the pin 15 in a retracted upper position.

The switch arm 17 and the associated contact 19 are connected by conductors 21 in parallel with the triggering contacts 10. After a predetermined period of reproducer energization, the switch arm 17 engages contact 19 and latches the reproducer motor 11 to the power lines 12. This action establishes a time delay which allows momentary electrical disturbances without placing the apparatus into a cycle of operation.

A phonograph pickup 22 is secured to the end of a tone arm 23 and engages a spiral track on the record 3 through the automatic turntable mechanism, not shown. The pickup 22 converts the signal established on the record to a corresponding electrical signal or output. The output of the pickup 22 is connected in series with a pair of serially connected amplifiers 24 and 25 to a dialing relay 26. The output of the pickup 22 after passing through amplifier 24 is also connected by a lead 27 to one winding 28 of a telephone line coupling transformer 29. A set of normally open contacts 30 of a latch relay 31 normally maintain line 27 open.

As shown in FIG. 2, the spiral track of record 3 begins at the outer edge with a spiral lead-in groove 32 which is traversed in a period generally corresponding to the time delay movement of pin 15. The lead-in groove 32 carries the pickup 22 into a continuous tone zone 33. The continuous tone signal is impressed upon relay 26 after suitable amplification by amplifiers 24 and 25. The normally open contacts 30 block the continuous tone signal from the telephone coupling transformer winding 28 and thus from the telephone lines 4.

The dialing relay 26 includes two sets of normally open contacts 34 and 35 respectively which are simultaneously controlled by a common armature 36. The contacts 34 are connected in series with a second winding 37 of transformer 29 across the telephone lines 4. The continuous tone section or zone 33 of the record 3 actuates relay 26 to close the contacts 34 and thereby loads the telephone lines 4 with the winding 37. This simulates the lifting of the handset in a conventional desk type telephone, not shown.

In the conventional telephone system, a direct current is connected across the telephone lines 4. Sound and/or signals are transmitted over the telephone lines by the modulating or periodic interrupting of a circulating direct current. Thus in manual dialing a conventional multidigit telephone number, a switch, not shown, is periodically opened. The switch is connected across the telephone line in a loading circuit and periodically interrupts the direct current established therein.

Further, each telephone number is one permutation of a series of characters or objects. The characters are established by dialing a mechanism having a plurality of stations or positions. Each station is normally assigned one digit of the ten digits 0 through 9 in the decimal number system. The positions corresponding to digits 2 through 8 are also progressively assigned three letters of the alphabet omitting the letter Q and the digit 0 is assigned the final letter Z. By successively dialing the stations corresponding to the series of characters in a telephone number, the dialing switch periodically interrupts the loaded telephone line to automatically dial a distant subscriber.

In the present invention, the dialing relay contacts 34 correspond to the manually operated dialing switch and the winding 37 is the loading winding as in a conventional telephone instrument. Consequently, suitable actuation of relay 26 simulates the actuation of a conventional dialing switch, as hereinafter described.

The continuous tone signal on the record also actuates relay 26 to close the second set of normally open contacts 35. The contacts 35 are connected in a power line 38 to a timer motor 39. The timer motor 39 is preferably of a synchronous variety. The motor 39 drives a spring-loaded lever 40 toward a switch 41 carried by a common support 42 for the motor and the switch. A coil spring 43 is secured at one end to the motor 39 and at the opposite end to the lever 40 and biases the lever 40 toward a stop 44. The switch 41 is spaced from the stop 44 such that a predetermined continuous motor operation is required before lever 40 engages the switch. Therefore relay 26 must be continuously energized for a corresponding period before switch 41 is actuated. This period is longer than that for the pickup 22 to traverse the continuous tone section 33 on the record 3.

The continuous tone zone 33 carries the pickup 22 into a dialing section 45 on the record 3. The dial section 45 comprises a series of sub-sections or zones, not shown, which are successively coded to successive characters or digits in a telephone number. The dialing sub-sections are alternately cut with a rapidly broken tone corresponding to a particular character and no tone to separate the signals of successive characters. The pickup 22 converts the dialing sub-sections to a series of closely time spaced, electrical pulses separated by relatively long periods of silence. The contacts 34 and 35 are closed by the electrical signal established by the presence of a tone and are opened in the presence of no tone and consequent loss of an electrical signal. The making and breaking of the contacts 34 and 35 is in accordance with the series of characters in the telephone number and therefore the dialing of a conventional telephone is automatically simulated.

Following the dialing section 45 on the record 3 is a latching portion or zone 46 which is a continuous tone longer than the first continuous tone zone 33. The signal from continuous tone of zone 46 continuously energizes relay 26 and thereby maintains a load on the telephone lines 4 by holding relay contacts 34 closed. The continuous tone signal also holds relay contacts 35 closed and the motor 39 continuously drives the lever 40 against the bias of spring 43. The continuous tone zone 46 is sufficiently long to allow the motor driven lever 40 to engage a switch arm 47 of switch 41. The switch arm 47 then engages a switch button 48 to close the switch 41 and complete the circuit to a winding 49 of the latch relay 31. The winding 49 is connected by a lead 50 in series with the switch arm 18 and contact 20 which are held closed by the pin 15 as long as the operation of the reproducer 2 continues. The latch relay 31 includes an armature 51 which simultaneously controls the previously noted contacts 30 and also two other sets of contacts 52 and 53, respectively. The contacts 52 are connected in parallel with switch 41 and therefore once the relay 31 is energized, contacts 52 latch the relay winding 49 to power lines 12. The contacts 53 are connected in parallel with the dialing relay contacts 34 and thus hold the load winding 37 across the telephone lines 4 independently of contacts 34. The contacts 30 of relay 31 connect the winding 28 of transformer 29 in a complete circuit with the phonograph pickup 22 and thus permit transmission of messages over the telephone lines 4 from the reproducer 2.

A message section 54 is established on the record immediately following the continuous tone section 46. This message section 54 is traversed by pickup 22 and the message is transmitted over the telephone lines 4 to the distant telephone station. This message may give any suitable information; for example the address or location of the instant detector and the type of disturbance such as an increase or decrease in thermal conditions.

The message portion 54 leads into a terminal groove 55 which carries the pickup 22 and the tone arm 23 rapidly to the center of the record 3. When this occurs, the reproducer 2 automatically resets itself to its initial position and pin 15 is retracted as set forth in the previously referred to patent to J. Erwood. The switch arm 17 then disengages contact 19 and opens the latch to the phonograph motor 11. Simultaneously, the switch arm 18 disengages contact 20 and opens the latch circuit to the latch relay 31 which opens the associated contacts 30, 52 and 53.

When contacts 30 open, the pickup 22 of reproducer 2 is operatively disconnected from the telephone lines 4. When contacts 53 open, the winding 37 is disconnected from the telephone lines 4 and the lines are unloaded in the same manner as replacing the handset in a conventional telephone, not shown. Finally, the opening of contacts 52 prevents reenergization of latch relay 31 until the timer switch 41 is again actuated by the continuous tone section 46 on the record 3. The apparatus is once again in standby condition.

If the thermal disturbance controlling detector 1 has corrected itself, the apparatus remains in a standby condition. However, if the disturbance has not corrected itself, the apparatus will recycle and again automatically dial and transmit the message section 54 to the distant telephone station.

Although not shown, if desired, apparatus can be provided for permitting the distant station to transmit a message ot the detection apparatus. The message would be recorded and thus be available to give instructions to the person correcting or checking on the disturbance.

Referring to FIGS. 3 and 4, an embodiment of the invention for push-button dialing is shown. A conventional desk variety telephone 56 includes a handset 57 adapted to rest on a base 58. The telephone 56 is connected to the telephone lines 59 by a transmitting button 60 and a coupling coil 61 connected in series with a handset switch 62 and a dialing switch 63. The transmitting button 60 is disposed within one end of the handset 57 and converts voice signals into modulating signals. The illustrated coil 61 is normally a portion of an auto-transformer type coupling coil, not shown in full, which amplifies both the outgoing and incoming voice currents.

The handset switch 62 is controlled by a pair of switch buttons 64 on the handset cradle portion of the telephone base 58. The handset 57 depresses the buttons 64 and holds switch 62 open when resting on the cradle portion. The normally open switch 62 closes when the handset 57 is removed from the base 58 of the telephone 56 and completes the circuit connecting winding 61 and button 60 across the telephone lines 59.

When the telephone subscriber manually dials the distant telephone, he actuates a perforated disc 65 in a predetermined manner and automatically actuates switch 63 to alternately break and make the series circuit including winding 61 and button 60 or any other similar loading circuit. This establishes a predetermined train of pulses by periodically stopping the normal flow of direct current in the telephone line circuit. The pulse train actuates suitable relays, not shown, at the central station to ring a distant telephone station.

Automatic dialing is accomplished in accordance with the embodiment of the present invention illustrated in FIGS. 3 and 4 as follows.

A reproducer 66 is operatively connected to the telephone lines 59 to automatically dial one of a series of predetermined telephone numbers in response to manual actuation of one of a plurality of switches 67 through any suitable means, such as a push-button, not shown.

The illustrated reproducer 66 comprises a drum 68 which is rotated by a motor 69 through a suitable speed reducing coupling 70. A tubular magnetic record 71 slips over the drum 68 and has a plurality of dialing sections 72, each of which magnetically carries a telephone number in a magnetic sound track. A plurality of magnetic heads 73 are supported on a common shaft 74. The shaft 74 is driven in a longitudinal direction by a shaft 75 which extends from the coupling 70. A disengageable clutch 76 connects shafts 74 and 75 to establish simultaneous axial movement of the shaft 74 with rotation of the drum 68. Each of the magnetic heads 73 is initially aligned with the beginning portion of a record dialing section 72 and progressively traverses the associated section 72 when motor 69 is energized. The switches 67 selectively connect one of the magnetic heads 73 to the input of an amplifier 77 which has its output connected to a relay winding 78 to control relay armature 79.

Armature 79 actuates a set of normally closed contacts 80. The relay contacts 80 are connected in series with the switches 62 and 63 and the transformer winding 61. As the magnetic heads 73 traverse the record 71, the magnetic head 73 which is connected in a complete circuit by a switch 67 establishes electrical impulses which are impressed upon the relay winding 78. In the presence of a tone signal on the associated record section 72, the winding 78 opens the relay contact 80. In the absence of a signal on the magnetic record section 72, the contacts 80 return to the normally closed position. The intermittent making and breaking of the contact 80 simulate the making and breaking of the dialing switch 63 by the manual operation of the disc.

The automatic dialing contacts 80 are maintained in a normally closed position so that the telephone may be employed in the normal manner with manual dialing.

If desired and permitted by the telephone company, suitable electrical operating connections can be directly made between an electromagnetic actuator and the switch 63 to substitute switch 63 for contacts 80. Consequently, the signal on the record sections 72 is in the reverse of the signal on the record shown in FIG. 2, that is, the periods of tone and silence are reversed.

The motor 69 for driving the drum 68 is connected to alternating current power lines 81 through a suitable time delay switch 82. The switch 82 is provided with the time delay in opening and is so timed that the motor 69 is energized for a period corresponding to the movement of the magnetic heads 73 past the associated dialing section 72. The switch 82 is coupled to switches 67 in any suitable manner such that switch 82 is closed when one of the push-button switches 67 is actuated. Therefore, the motor 69 only operates during a period of automatic dialing.

At the completion of an automatic dialing operation, the magnetic heads 73 are automatically returned to their initial position. A solenoid 83 is operatively associated with the coupling clutch 76 which connects the shafts 74 and 75 and is energized when the motor 69 is energized. To effect simultaneous operation of the solenoid 83 and motor 69, lines 84 connect the solenoid 83 in parallel to motor 69 and in series with the normally open time delay switch 82. Therefore, clutch 76 is held in only during the dialing operation. A coil spring 85 encircles shaft 74 and engages a collar 86 and coupling clutch 76. The spring 85 is compressed as the shaft 74 moves under the action of clutch 76. When the clutch is de-energized, the spring 85 expands and returns the shaft 74 to its original position.

The operation of the automatic dialing system of FIGS. 3 and 4 is described as follows:

The subscriber picks up the handset 57, thereby releasing switch buttons 64 and closing the switch 62. This loads the telephone lines 59. Subscriber then actuates one of the switches 67 which carries the desired telephone number and simultaneously closes the time delay switch 82. The motor 69 and solenoid 83 are simultaneously energized. The drum 68 is rotated by motor 69 and the magnetic heads 73 are driven axially of the tubular magnetic record 71. The magnetic head 73 converts the recorded telephone number into corresponding electrical pulses. The electrical impulses after suitable amplification by amplifier 77 are impressed on the relay winding 78 which actuates its contact 80 to stimulate the manual dialing of the telephone 56. When the magnetic head 73 reaches the end of an associated dial section 72, the time delay switch 82 opens. The associated switch 67 is also opened. The energization circuit to the solenoid 83 and motor 69 is broken and the spring 85 then returns the shaft 74 and the associated magnetic heads 73 to their initial standby position.

Although the illustrated embodiment of FIGS. 3 and 4 employs a plurality of magnetic heads 73, a single magnetic head may be used and manually or automatically positioned adjacent the desired dialing section in any suitable manner.

Further, the complete dialing operation may be accomplished with a single revolution of a suitable record such that the pickup or sensing device automatically terminates to a standby position. No separate reset mechanism would then be necessary.

The automatic dialing device may also be interlocked with the handset switch or the like such that if the operating subscriber replaces the handset or otherwise opens the handset switches prior to completion of a dialing cycle, the dialing device immediately returns to standby.

Figure 5:
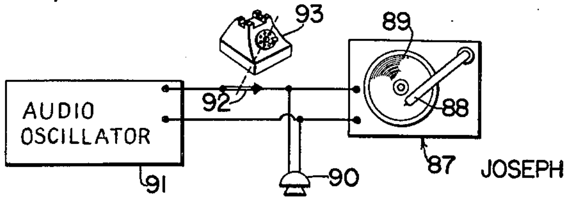
FIG. 5 is a diagrammatic illustration of apparatus for making automatic dialing records.

Referring to FIG. 5, a system for recording telephone numbers upon a suitable record is shown. A suitable recording device 87 includes a cutting stylus 88 to cut a disc record 89. A conventional microphone 90 and an audio oscillator 91 are connected in parallel to the input of the recording device 87. In series with the audio oscillator 91 is a telephone dialing switch 92 which is operated by a conventional telephone dial 93. To cut the record 89, the recording device is started through a suitable operating circuit, not shown. The oscillator 91 is energized after the stylus 88 traverses a lead-in or starting groove to record a continuous tone upon the record 89. At the end of the continuous tone zone, the desired telephone number is dialed by manual operation of the telephone dial 93 which by actuation of switch 92 interrupts the output of the oscillator 91 and establishes a series of tone pulses on the record 89 which are automatically coded to the telephone number which is dialed. Subsequently, the latching tone signal is applied to the record 89 from the audio oscillator 91. The audio oscillator 91 is then disconnected and a message placed on the record 89 by speaking into the microphone 90 to complete the record 89.

Although the dialing system as described employs successively established pulses or signals, they may be simultaneously established and successively delayed through any suitable electrical apparatus to give the necessary progressive actuation to a dialing switch. Further, if dialing signals other than a train of pulses are employed in the telephone system, the output record is changed accordingly. For example, if a series of different frequency signals were used for dialing, the record can carry the required frequency signals and transmit them over the telephone lines.

The apparatus in an automatic alarm system and the like can be made to automatically recycle such that it will continue to operate until the called telephone has been answered and the defect corrected.

Other types of control records may be employed within the scope of the present invention and may be automatically formed by suitable modification of the disclosed record forming process. For example, punch tape or printed surfaces may be used to store coded marks and suitable sensing devices used to convert the marks to electrical signals which then actuate a relay means to effect the automatic dialing.

Further, when employing a sound record, the respective loading and latching portions may be established to employ other than a time differential to effect their respective functions. For example, a different frequency signal may be recorded on the loading portion and on the subsequent latching portion of the record. Frequency responsive relay coils or the like are connected in the circuit to effect the loading and latching functions.

Although a relay is shown to make and break the load across the telephone line, any other suitable direct acting electrical switch means may be substituted therefor. For example, a transistor or the like may be connected in the loading circuit and sequentially biased to conduct by the signal from the storage medium carrying the coded signals.

The present invention provides a simple and reliable apparatus for automatically and electronically dialing of telephones in a telephone system employing in particular a multi-character designation for each subscriber.

Various modes of carrying out the invention are contemplated as being within the scope of the following claims particularly pointing out and distinctly claiming the subject matter which is regarded as the invention.

I claim:

1. A protective device to transmit in response to a predetermined condition a signal to a remote telephone station over a telephone line system employing various combinations of a predetermined number of characters to identify different telephone stations, a storage medium having sensible marks coded to the characters of a distant telephone and a message successively carried on the storage medium, sensing means operatively associated with the storage medium and adapted to successively reproduce said marks into electrical triggering signals and into a corresponding message, telephone line loading and transmitting means connectable across the telephone line and to said sensing means, normally open switch means connected in series with said loading and transmitting means across the telephone lines and having electromagnetic means for opening and closing the circuit, an energizing circuit for said sensing means, means in said energizing circuit normally operatively disenabling said sensing means and responsive to said predetermined condition to operatively enable said sensing means and thereby actuate the switch means to dial said remote telephone station in accordance with said sensible marks, message-transmitting switch means connected in a series circuit with said line loading and transmitting means and connecting the loading and transmitting means to said sensing means and to said telephone lines independently of said normally open switch means, and means responsive to completion of said dialing signals and connected to actuate said last-named switch means to thereby operably connect the sensing means to said line loading and transmitting means and the loading and transmitting means to the telephone line for transmission of said message.

2. In a protective device adapted to be operatively connected to a telephone line circuit to transmit a message thereover to a distant telephone station in response to a predetermined disturbance, a sound record having successive sound zones, a first sound zone carrying a continuous tone signal, a second sound zone carrying a time spaced interrupted tone signal coded to the time spaced pulses established in a telephone line to dial a distant telephone station, a third sound zone carrying a continuous tone of longer duration than said first continuous tone signal, a fourth sound zone carrying a message, a reproducer adapted to be operatively associated with the record to establish corresponding continuous electrical signals, electrically operated means responsive to said electrical signals to connect a load across the telephone line circuit in synchronism with said electrical signals, timer means connected to said reproducer and responsive to a continuous electrical signal corresponding in time to said third zone signal to latch said load across the telephone line independently of the signals from said reproducer to permit transmission of said message, and means to operatively connect the reproducer to the telephone line for transmission of said message.

3. In a protective device adapted to be operatively associated with a telephone line to transmit a message to a remote telephone station in response to a predetermined disturbance, record means having a series of signal sound tracks each adapted to receive successive time-spaced tone signals corresponding to the successive characters in the telephone number of the distant telephone station and having a sound track adapted to store a previously recorded outgoing message, reproducer means operatively associated with the record means to first traverse said signal sound tracks and then to traverse the message portion to establish electrical output signals corresponding to the recorded signals, means responsive to a local disturbance to initiate operation of the reproducer, load means connected in a loading circuit with the telephone lines to load the telephone lines for dialing a distant telephone and for transmitting a message to a distant telephone, normally open switch means connected in the loading circuit in series with the load means and responsive to the electrical signals established by said reproducer to intermittently make and break the loading circuit and thereby dial a distant telephone station, and second normally open switch means independent of said switch means and including operating means connected to the reproducer to respond to completion of said dialing signals and connected in a series circuit with said load means to the telephone lines to positively latch the load means to the telephone lines independently of the state of the first named normally open switch means and permit transmission of the previously recorded message.

4. A warning device adapted to be operatively associated with a telephone line system to dial and to transmit a message to a remote telephone station in response to a local disturbance, the dialing in said telephone line system of any particular telephone station being by successive series of spaced breaks in a completed telephone circuit including transmission winding and having a circulating current to establish successive trains of stepping pulses, which comprises a sound record sequentially having a loading zone adapted to establish a continuous signal and a dialing zone adapted to establish a successive series of spaced continuous signals corresponding to the successive series of spaced breaks in the telephone station to be dialed and a latching zone adapted to establish a continuous signal longer than said first continuous signal and a message zone adapted to establish previously recorded message signals, a reproducer operably associated with the sound record to progressively traverse said signal zones and adapted to generate corresponding electrical signals, drive means responsive to said local disturbance to effect relative movement between said record and said reproducer, normally open contact means serially included with said transmission winding in said telephone circuit, electromagnetic means connected to said contact means and to said reproducer to actuate said contact means in accordance with the signals on said record, said loading zone establishing a signal to close the contacts and load the telephone line, said dialing zone subsequently establishing a series of spaced signals to actuate the contacts to intermittently break said loading and thereby dial the distant telephone station, winding means magnetically coupled to the transmission winding, circuit controlling means to operatively connect said last named winding means to said reproducer for transmission of a message, contacts means adapted to short circuit said first named contact means, timer means operatively associated with said circuit controlling means and said last named contact means to actuate them after a predetermined period of energization longer than the period of said loading zone on said record, an energizing source for said timer operatively connected to said reproducer and responsive to the signals established thereby to connect the timer to the source, said timer being continuously energized by said latching zone to an actuating position to actuate the circuit controlling means and the associated contact means, and means responsive to said last named actuation to hold said circuit controlling means and said associated contact means in an actuated state to permit transmission of the previously recorded message.

5. A warning device adapted to be operatively associated with a telephone line system to dial and to transmit a message to a remote telephone station in response to a local disturbance, the dialing in said telephone line system of any particular telephone station being by successive series of spaced breaks in a completed telephone circuit including transmission winding and having a circulating current to establish successive trains of stepping pulses, which comprises a sound record sequentially having a loading zone adapted to establish a continuous signal and a dialing zone adapted to establish successive series of spaced continuous signals corresponding to the successive series of spaced breaks in the telephone station to be dialed and a latching zone adapted to establish a continuous signal longer than said first continuous signal and a message zone adapted to establish previously recorded message signals, a reproducer operably associated with the sound record to progressively traverse said signal zones and adapted to generate corresponding electrical signals, drive means responsive to said local disturbance to effect relative movement between said record and said reproducer, cycling means responsive to predetermined actuation of said drive means to latch said reproducer into a cycle traversing all of said record zones, normally open contact means serially included with said transmission winding in said telephone circuit, electromagnetic means connected to said contact means and to said reproducer to actuate said contact means in accordance with the signals on said record, said loading zone establishing a signal to close the contacts and load the telephone line, said dialing zone subsequently establishing a series of spaced signals to actuate the contacts to intermittently break said loading and thereby dial the distant telephone station, winding means magnetically coupled to the transmission winding, circuit controlling means to operatively connect said last named winding means to said reproducer for transmission of a message, contact means adapted to short circuit said first named contact means, timer means operatively associated with said circuit controlling means and said last named contact means to actuate them after a predetermined period of energization longer than the period of said loading zone on said record, an energizing source for said timer operatively connected to said reproducer and responsive to the signals established thereby to connect the timer to the source, said timer being continuously energized by said latching zone to an actuating position to actuate the circuit controlling means and the associated contact means, and means responsive to said last named actuation to hold said circuit controlling means and said associated contact means in an actuated state to permit transmission of the previously recorded message, and means controlling said last named means and operatively associated with said cycling means to release said last named means and return said circuit controlling means and said associated contact means to a non-actuated state.

6. A warning device adapted to be operatively associated with a telephone to transmit a signal over a telephone line system to a distant telephone station in response to a predetermined disturbance, the telephone line system employing a successive series of periodic breaks in a telephone line circuit to dial a distant telephone station, which comprises a sound record sequentially having a continuous tone load portion and an interrupted tone dialing portion coded to a predetermined telephone number and a continuous tone latch portion having a longer period than the tone load portion and an outgoing message portion, a reproducer adapted to convert said record portions to corresponding electrical signals, motive means adapted to relatively move said record and said reproducer to successively convert said record portions, means responsive to said predetermined disturbance to initiate operation of said motive means, a coupling transformer having one winding connected across the telephone line to permit transmission of a message to a distant telephone station, an electromagnetic switch having dialing contacts connected in series with said winding, said contacts being normally open to operatively disconnect the transformer from the telephone line, means responsive to operation of the motive means to connect said reproducer to said electromagnetic relay whereby the continuous tone load portion of the record assures loading of the telephone line system and the dialing portion subsequently actuates the relay to dial the distant telephone station, electromagnetic means having contact means adapted to connect a second winding of the coupling transformer to the reproducer to transmit a message over the telephone lines and to shunt said dialing contacts to latch the first winding across the telephone lines and to latch itself in energizing circuit, and means responsive to the latch portion of said record to actuate said relay means, whereby said message portion is subsequently transmitted to the distant telephone station.

7. A warning device responsive to a predetermined disturbance and adapted to automatically transmit a message over a telephone line system to a distant telephone station, said telephone line system employing a dialing system having various combinations of predetermined characteristic coded to different telephone substations and having a manually actuated switch means connecting a telephone substation to the telephone line to make and break a circuit a predetermined number of times to establish a successive train of dialing pulses, which comprises a phonograph record having a spiral sound groove, said sound groove having an initial loading portion and a second dialing portion and a third latch portion and a fourth message portion, a phonograph pickup adapted to engage the groove and generate electrical signals corresponding to previously recorded electrical signals, a phonograph motor adapted to progressively relatively move the pickup and the record, means responsive to said predetermined disturbance to initiate operation of the phonograph motor, switch means responsive to a predetermined operation of said motor to latch said motor to a power source and permit complete relative movement of the pickup and the record, an electromagnetic relay having a winding connected to said pickup and having a first set of contacts in a normally open set and a second set of contacts in a normally open state, a coupling transformer having a first winding connected in a series circuit with said first set of contacts across the telephone lines whereby said first loading portion connects the first winding across the telephone lines and said second dialing portion pulsatingly energizes the relay winding to make and break the series circuit to simulate manual dialing the telephone number of the distant telephone, said transformer having a second winding magnetically coupled to the first winding, a timer having a winding connected in series with said second set of contacts and having a first and a second set of normally open contacts closed upon a predetermined continuous energization corresponding at least to the latch portion on the record, the first set of said timing relay contacts being connected in series circuit with the second winding of said coupling transformer and the pickup to permit transmission of the message on the record via the transformer, the second set of said timer contacts latching said timer in an energizing circuit independently of said second set of contacts to maintain said second winding connected to said pickup, the third set of said timer contacts latching said first winding of the coupling transformer in circuit across said telephone lines, and switch means responsive to completion of said outgoing message to return said pickup and said record to an initial starting position and opening said latch energizing circuit to return the apparatus to standby.

8. A warning device adapted to be connected to a conventional telephone line and to automatically transmit a message to a distant telephone station in response to a predetermined local disturbance, which comprises a phonograph record, an initial continuous tone portion on said phonograph record, a dialing portion including a series of interrupted tone portions coded to the characteristics of a telephone number on said phonograph record immediately following said continuous tone portion, a second continuous tone portion of longer duration than said initial tone portion on said phonograph record immediately following said dialing portion, an outgoing message portion on said record immediately following said second continuous tone portion, a phonograph adapted to play back said phonograph record, switch means responsive to the local disturbance to energize said phonograph, switch means responsive to predetermined phonograph operation to latch said phonograph in an operating circuit, a relay having a winding connected to said phonograph and having a first set of normally opening contacts and a second set of normally open contacts, said relay being responsive to the play back signals to close said first and second set of contacts, a coupling transformer having a first winding and a second winding magnetically coupled to the first winding, said first winding and said first set of contacts being serially connected across the telephone lines whereby said first continuous tones assures a positive loading of the telephone circuit and the dialing portion actuates the relay to open and close the first contacts to dial the distance telephone station, a timing motor serially connected with said second set of contacts and energized in response to the output of said phonograph, switch means operatively associated with the timing motor and closed thereby in response to continuous energization of said motor longer than said first continuous tone portion, a latch relay serially connected to a source of power in series with said switch means, first relay contacts of said latch relay connected in parallel with the first contacts of said first named relay to load the telephone line independently of said relay, second relay contacts of said latch relay serially connected with said latch relay to the power source, third relay contacts of said latch relay serially connected with said second winding of the coupling transformer to the phonograph to transmit said outgoing message, and means responsive to the completion of said outgoing message to reset the phonograph to an initial position and to open the latch to the phonograph and to the latch relay to return the apparatus to standby.

9. In a protective device to transmit in response to a predetermined condition a signal to a remote telephone station over a telephone system employing various combinations of a predetermined number of characters to identify different telephone stations, a storage medium having a loading zone carrying unique sensible marks and a dialing zone carrying sensible dialing marks coded to the characters of a distant telephone station and a latching zone carrying unique sensible marks, sensing means operatively associated with the storage medium to reproduce said marks into electrical triggering signals, electrically operated means electrically connecting said sensing means and said telephone line circuit and including means responsive to said first unique sensible marks to place a load upon the telephone line circuit, said electrically operated means including means responsive to said dialing marks to make and break said load across the telephone line, and said electrically operated means including means responsive to said sensible marks in said latching zone to latch a load across the telephone line independently of the signals on said storage medium to permit transmission over said line from said storage medium.

10. In a protective device to transmit a signal in response to a predetermined condition to a remote telephone station over a telephone system employing various combinations of a predetermined number of characters to identify different telephone stations, a storage medium having a loading zone carrying a unique signal, and having a dialing zone carrying a series of unique signals coded to the characters of a distant telephone station and having a latching zone carrying a unique signal and having a message zone carrying a message to be transmitted to the distant station, sensing means operatively associated with the storage medium to successively reproduce said signals into electrical signals, electrically operated means connected to said sensing means and said telephone line system and being responsive to said successive electrical signals to load the telephone line during said loading zone signals and to make and break the load during said dialing zone, electrically operated means connected to said sensing means and said telephone line circuit and being responsive to said reproduced latching zone signal to latch a load including a sound transmitting means across said telephone line system and to subsequently transmit the message on said message zone.

References Cited in the file of this patent

UNITED STATES PATENTS

| | | |
|---|---|---|
| 1,992,585 | Teyte | Feb. 26, 1935 |
| 2,399,229 | Jacobson | Apr. 30, 1946 |
| 2,827,515 | Zuber | Mar. 18, 1958 |

UNITED STATES PATENT OFFICE

CERTIFICATE OF CORRECTION

January 8, 1963

Patent No. 3,072,746

Joseph J. Zimmermann

It is hereby certified that error appears in the above numbered patent requiring correction and that the said Letters Patent should read as corrected below.

Column 8, line 43, after "said" insert -- first --.

Signed and sealed this 18th day of June 1963.

(SEAL)
Attest:

ERNEST W. SWIDER
Attesting Officer

DAVID L. LADD
Commissioner of Patents